US006553290B1

(12) United States Patent
Pillar

(10) Patent No.: US 6,553,290 B1
(45) Date of Patent: Apr. 22, 2003

(54) EQUIPMENT SERVICE VEHICLE HAVING ON-BOARD DIAGNOSTIC SYSTEM

(75) Inventor: Duane R. Pillar, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 09/500,506

(22) Filed: Feb. 9, 2000

(51) Int. Cl.⁷ ............................................. G01M 17/00
(52) U.S. Cl. ...................................................... 701/33
(58) Field of Search ............................... 701/29–35, 36, 701/39, 43–44, 62–63, 70, 76, 92, 97; 340/425.5, 439; 345/700, 763, 819–820, 850–851; 702/57–59

(56) References Cited

U.S. PATENT DOCUMENTS

| | | | | |
|---|---|---|---|---|
| 4,843,557 A | * | 6/1989 | Ina et al. ..................... | 701/114 |
| 5,445,347 A | * | 8/1995 | Ng .......................... | 246/169 R |
| 5,555,171 A | * | 9/1996 | Sonehara et al. ............. | 701/33 |
| 6,012,004 A | * | 1/2000 | Sugano et al. ................ | 701/33 |
| 6,141,608 A | * | 10/2000 | Rother ........................ | 701/33 |
| 6,154,122 A | * | 11/2000 | Menze ..................... | 340/425.5 |
| 6,181,994 B1 | | 1/2001 | Colson et al. | |
| 6,208,948 B1 | | 3/2001 | Klingler et al. | |
| 6,243,628 B1 | * | 6/2001 | Bliley et al. .................. | 701/29 |

OTHER PUBLICATIONS

Miltope Receives $13.5 Million Order for SPORT, Jan. 25, 2000, Montgomery, AL.

Computer Diagnoses Vehicle Deficiencies, Sgt. Shawn Woodard, Fort Jackson Leader, Jul. 26, 2002, pp. 1–2.

SPORT Ad and Technical Specifications Sheet; Miltope Corporation, 2 pages.

Miltope Receives $16 Million Defense System Integration Award, PRNewswire, Mar. 26, 2000.

STE/ICE–R Design Guide for Vehicle Diagnostic Connector Assemblies, Report No. CR–82–588–003 REV 1, Feb. 1988.

* cited by examiner

Primary Examiner—Thu Nguyen
(74) Attorney, Agent, or Firm—Foley & Lardner

(57) ABSTRACT

An equipment service vehicle comprises a network communication link, an engine system, a transmission system, and an operator interface. The engine system includes an engine and an electronic engine control system that is coupled to the engine and to the network communication link. The electronic engine control system controls the engine and transmits information pertaining to the health and operation of the engine on the network communication link. The transmission system includes a transmission and an electronic transmission control system. The electronic transmission control system controls the transmission and transmits information pertaining to the health and operation of the transmission on the network communication link. The operator interface is coupled to the network communication link. The operator interface includes a display that displays the health and operation information of the engine and the transmission to a human operator.

48 Claims, 7 Drawing Sheets

EQUIPMENT SERVICE VEHICLE HAVING ON-BOARD DIAGNOSTIC SYSTEM

FIELD OF THE INVENTION

This invention relates to diagnostic systems for equipment service vehicles. In particular, this invention relates to an on-board diagnostic system for equipment service vehicles.

DESCRIPTION OF RELATED ART

Modern vehicles have become increasingly complex and difficult to maintain. In order to enable more efficient vehicle maintenance, it is desirable to be able to accurately diagnose malfunctioning subsystems, such as engine systems, transmission systems, and so on, as well as specific vehicle components. When a malfunction is not properly diagnosed, the result is typically that parts which are fully operational are repaired or replaced, that parts which are repairable are replaced, and/or that parts which are not fully operational are not repaired or replaced. Accurate diagnoses therefore allow more efficient vehicle maintenance by avoiding unnecessary repairs and replacements, and by enabling necessary repairs and replacements to be made.

It is known to provide electronic diagnostic systems to aid in the accurate diagnoses of vehicle malfunctions. Government Report No. CR-82-588-003, entitled "STE/ICE-R Design Guide For Vehicle Diagnostic Connector Assemblies," February 1988, describes a diagnostic system used in connection with military vehicles. According to the approach described in this document, a military vehicle is provided with numerous sensors that are located throughout the vehicle and each of which obtains information pertaining to the health and operation of a subsystem of the vehicle. The sensors are used to measure typical parameters of interest such as engine RPM, engine temperature, fuel pressure, and so on. The sensors are connected by way of vehicle wiring to a common connector assembly. Diagnostic equipment provided at a maintenance depot is then capable of connecting to the various sensors by way of the connector assembly. At the maintenance depot, the diagnostic equipment can be utilized to perform tests on the vehicle to aid pinpointing the source of vehicle system malfunction.

In this arrangement, the sensors that are used by the diagnostic system are used exclusively by the diagnostic equipment at the maintenance depot, and not by other systems during normal operation of the vehicle. Additionally, in this arrangement, the connector assembly defines a hardwired analog interface between the sensors and the diagnostic equipment, and the diagnostic equipment expects signals appearing at given pins of the connector assembly to have predefined signal characteristics that are unique to the sensor utilized.

This approach suffers several disadvantages. First, this approach is expensive to implement because it requires numerous sensors above and beyond those required for normal operation of the vehicle. Additionally, the required sensors typically have unique signal characteristics that are specifically matched to the diagnostic equipment, and therefore the sensors are specialty items that are more expensive and not commonly available.

Second, this approach results in a diagnostic system with an unduly limited capability to accurately diagnose system faults. The capabilities of the diagnostic system are limited by the fact that the diagnostic system only utilizes information that is available from the diagnostic system sensors and not from other sources of information available on-board the vehicle. Therefore, the number of different types of information that can be obtained is limited to the number of diagnostic system sensors utilized. Further, because the sensors that are utilized tend to be specialty items as previously noted, they often do not incorporate the latest advances in sensor technology that provide performance/durability improvements over earlier sensor technologies. This further limits the accuracy of the diagnostic system as compared to that which could otherwise be achieved.

Finally, this approach is unduly cumbersome to utilize. As previously noted, the diagnostic equipment is provided at a maintenance depot and not on-board the vehicle. Therefore, in order to have a vehicle malfunction diagnosed, the vehicle must be brought to the maintenance depot. This requirement is inconvenient and limits the potential for field servicing of vehicles to minimize the amount of time that the vehicle is out of service for maintenance reasons.

SUMMARY OF THE INVENTION

The present invention overcomes the problems of conventional diagnostic systems for equipment service vehicles. In particular, in one particularly preferred embodiment, the invention provides an equipment service vehicle comprising a network communication link, a plurality of vehicle subsystems, a test control module, and an operator interface. The vehicle subsystems each comprise a mechanical system and an electronic control system that controls the mechanical system. For example, one vehicle subsystem may comprise an engine and an engine control system, and another vehicle subsystem may comprise a transmission and a transmission control system. Each respective electronic control system is connected to the network communication link and transmits information pertaining to the health and operation of the associated mechanical system on the network communication link. The test control module is coupled to the plurality of vehicle subsystems by way of the network communication link. The test control module is programmed to acquire at least some of the information pertaining to the health and operation of the mechanical system. The operator interface is coupled to the test control module and comprises a display that displays the at least some information pertaining to the health and operation of the mechanical system.

According to another particularly preferred embodiment of the invention, the invention provides a method of diagnosing a fault on an equipment service vehicle comprising providing the equipment service vehicle with an on-board diagnostic system. The on board diagnostic system comprises a test control module and an operator interface that are mounted on the vehicle. The method also comprises displaying a menu of test options to an operator using the operator interface and receiving an operator input using the operator interface. The input is indicative of a menu selection made by the operator, and the menu selection indicates a test selected by the operator to be performed on the vehicle. Further, the method comprises performing the selected test on the vehicle in response to the operator input, and displaying results of the test to the operator using the operator interface.

According to yet another particularly preferred embodiment of the invention, the invention provides an equipment service vehicle comprising a network communication link, an engine system, a transmission system, and an operator interface. The engine system includes an engine and an electronic engine control system that is coupled to the engine and to the network communication link. The electronic engine control system controls the engine and transmits information pertaining to the health and operation of the engine on the network communication link. The transmission system includes a transmission and an electronic transmission control system. The electronic transmission control system controls the transmission and transmits information pertaining to the health and operation of the transmission on the network communication link. The operator or interface is coupled to the network communication link and includes a display that displays the health and operation information of the engine and the transmission to a human operator.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

Figure 1:
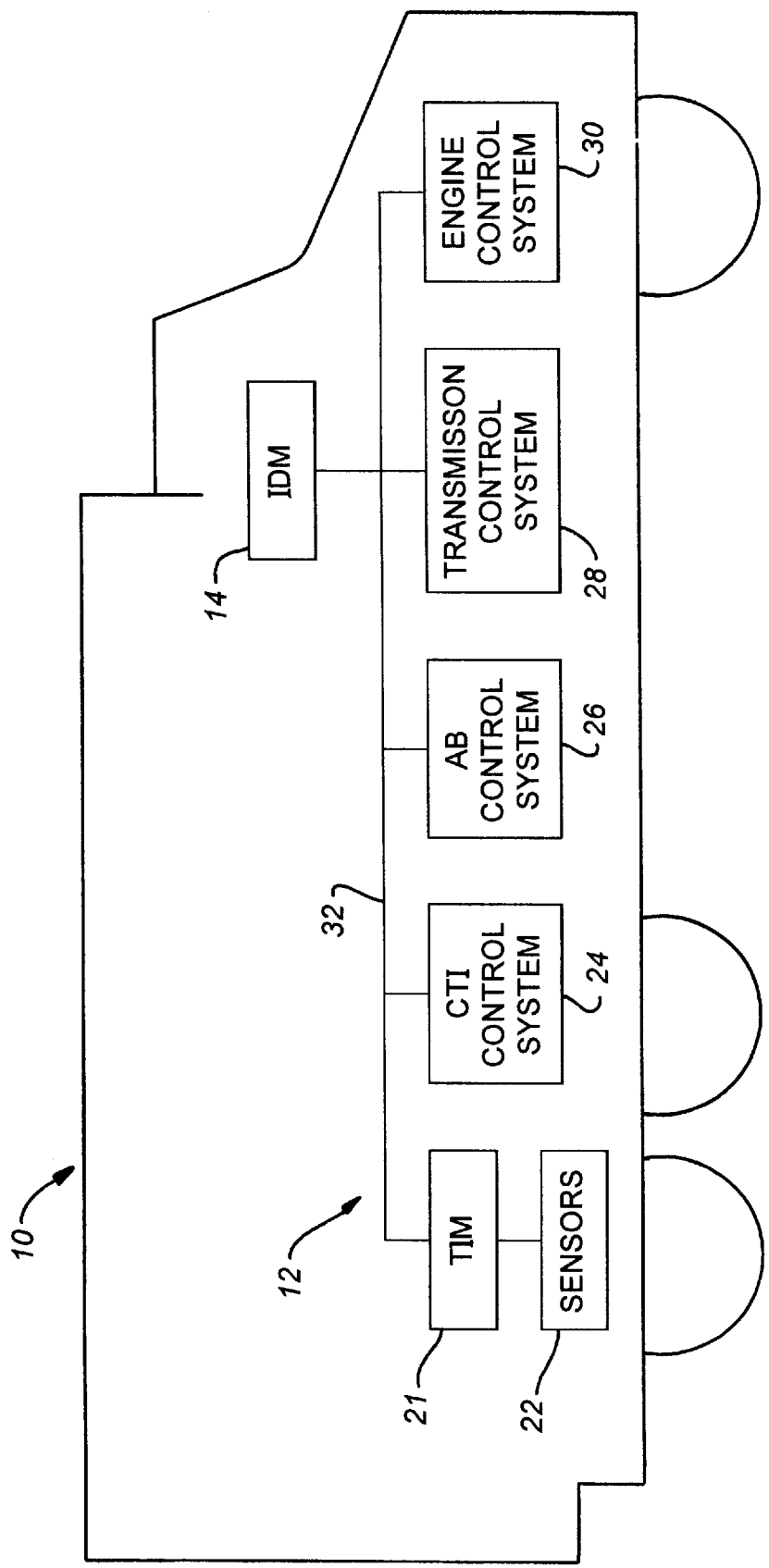
FIG. 1 is a schematic view of a military vehicle having a diagnostic system according to one embodiment of the present invention.

Referring now to FIG. 1, a preferred embodiment of an equipment service vehicle 10 having a diagnostic system 12 according to an embodiment of the invention is illustrated. By way of overview, the diagnostic system 12 comprises an intelligent display module 14, a test interface module 21 connected to a plurality of sensors 22, and a plurality of additional vehicle control systems 24–30. The intelligent display module 14, the test interface module 21, and the plurality of additional vehicle control systems 24–30 are interconnected with each other by way of a network communication link 32.

More specifically, the vehicle 10 is a military vehicle and, in particular, a medium tactical vehicle. However, it should be understood that the diagnostic system 12 of FIG. 1 could also be used with other types of military vehicles. For example, the diagnostic system 12 could be used in connection with heavy equipment transporter vehicles, which are used to transport battle tanks, fighting and recovery vehicles, self-propelled howitzers, construction equipment and other types of equipment. These types of vehicles are useable on primary, secondary, and unimproved roads and trails, and are able to transport in excess of 100,000 pounds or even in the range of 200,000 pounds or more. The diagnostic system 12 can also be used in connection with palletized load transport vehicles, in which a mobile truck and trailer form a self-contained system capable of loading and unloading a wide range of cargo without the need for forklifts or other material handling equipment. Such trucks are provided with a demountable cargo bed and a hydraulically powered arm with a hook that lifts the cargo bed on or off the truck. These trucks may be also provided with a crane to drop off the pallets individually if the entire load is not needed. Further, the diagnostic system 12 can also be used in connection with trucks designed for carrying payloads for cross country military missions. Such trucks may include, for example, cargo trucks, tractors, fuel servicing trucks, portable water trucks, and recovery vehicles (with crane and winch). Such trucks are capable of passing through water crossings three or four or more feet deep. These trucks can also be used for missile transports/launchers, resupply of fueled artillery ammunition and forward area rearm vehicles, refueling of tracked and wheeled vehicles and helicopters, and recovery of disabled wheeled and tracked vehicles. The diagnostic system 12 can be used in connection with a wide range of other military vehicles as well.

The intelligent display module 14 provides an operator interface to the diagnostic system 12 and also provides intelligence used to conduct diagnostic tests and other services. In particular, the intelligent display module 14 includes a test control module 15 (which further includes a microprocessor 16 and a diagnostic program 17) and an operator interface 18 (which further includes a display 19 and a keypad 20) (see FIG. 2).

In the preferred embodiment, the test control module 15 and the operator interface 18 are provided as a single, integrated unit (namely, the intelligent display module 14) and share the same housing as well as at least some of the internal electronics. Other arrangements are possible, however. For example, as can be easily imagined, it would also be possible to provide the test control module 15 and the operator interface 18 in the form of separate physical units, although this arrangement is not preferred for reasons of increased cost and parts count. Both the test control module 15 and the operator interface 18 can be obtained in the form of a single, integrated unit from Advanced Technology, Inc., Elkhart, Ind. 46517. This product provides a generic flat panel 4 line×20 character display 19, four button keypad 20, microprocessor 16, and memory that is capable of being programmed with a program (such as the diagnostic program 17) to customize the intelligent display module for a particular application. Of course, a more (or less) elaborate intelligent display module could also be utilized.

Also in the preferred embodiment, the intelligent display module 14 is semi-permanently mounted within the vehicle 10. By semi-permanently mounted, it is meant that the intelligent display module 14 is mounted within the vehicle 10 in a manner that is sufficiently rugged to withstand normal operation of the vehicle for extended periods of time (at least days or weeks) and still remain operational. However, that is not to say that the intelligent display module 14 is mounted such that it can never be removed (e.g., for servicing of the intelligent display module) without significantly degrading the structural integrity of the mounting structure employed to mount the intelligent display module 14 to the remainder of the vehicle 10. The intelligent display module 14 is preferably mounted in an operator compartment of the vehicle 10, for example, in a storage compartment within the operator compartment or on an operator panel provided on the dashboard.

The operation of the test control module 15, and in particular of the microprocessor 16 to execute the diagnostic program 17, is shown and described in greater detail below in conjunction with the flow chart of FIG. 4. In general, the microprocessor 16 executes the diagnostic program 17 to diagnose subsystem faults, to display fault information, to maintain vehicle maintenance records, and to perform data logging for system diagnosis and/or for accident reconstruction. Depending on the application, it may be desirable to incorporate additional services as well, or to incorporate fewer than all of these services.

The operator interface 18 includes the display 19 which is used to communicate (and, in particular, to display) information to the operator. For example, the display 19 is used to prompt the operator to enter information into the keypad 20, or to take certain actions with respect to the vehicle during testing (e.g., bring the engine to a specified RPM level). The display 19 is also used to display a menu or series of menus to allow the operator to select a test to be performed or to select another service of the intelligent display module 14 to be utilized. The display 19 is also used to display status information during system startup and during testing, and to display any error messages that arise during system startup or during testing. The display 19 is also used to display input data and fault mode indicators from control systems 24–30, and any other information from additional vehicle subsystems. The display 19 is also used to display information from discrete sensors such as the sensors 22. The display 19 is also used to display the results of diagnostic tests that are performed (e.g., a pass/fail message or other message).

Preferably, the display 19 displays all of this information to the operator in a user-friendly format as opposed to in the form of codes that must be interpreted by reference to a separate test or service manual. This is achieved in straight-forward fashion by storing in the memory of the intelligent display module 14 information of the type commonly published in such manuals to facilitate manual interpretation of such codes, and using this information to perform the translation automatically. Likewise, as previously noted, the display 19 is used to prompt the operator to take certain actions with respect to the vehicle during testing and to otherwise step the operator through any test procedures, without reference to a test manual. This allows the amount of operator training to be reduced.

The operator interface 18 also includes the keypad 20 which is used to accept or receive operator inputs. For example, the keypad 20 is used to allow the user to scroll through and otherwise navigate menus displayed by the display 19 (e.g., menus of possible tests to be performed on the vehicle 20), and to select menu items from those menus.

As previously noted, it would also be possible to utilize a more elaborate intelligent display module. For example, a more elaborate keypad 20 could be utilized if more data entry capability is desired. In this regard, however, it is noted that the intelligent display module 14 also preferably includes a communication port that allows the display module to communicate with a personal computer 33 by way of a communication link 36 (see FIG. 2). The personal computer 33 can be used to retrieve, manipulate and examine data stored within the intelligent display module 14. For example, if the intelligent display module 14 includes a data logger as described below, the personal computer can be used to retrieve and examine the information stored by the data logger. Likewise, if the intelligent display module 14 implements a vehicle go maintenance jacket, the personal computer 33 can be used to retrieve and modify data stored in the vehicle maintenance jacket. Further, using the personal computer 33, it is possible to integrate the diagnostic system 12 with an interactive electronic technical manual (IETM), to allow the interactive electronic technical manual to access the data available from the diagnostic system 12.

The test interface module 21 accepts requests from the intelligent display module 14 for information from the sensors 22, retrieves the requested information from the respective sensor 22, converts input signals from the respective sensor 22 into a format that is compatible with the network communication link 32, and transmits the information from the respective sensor 22 to the intelligent display module 14 via the network communication link 32. The test interface module 21 is therefore preferably implemented as a passive unit with no standard broadcasts that burden the communication link 32. As a result, in operation, the test interface module 21 does not regularly transmit data on the network communication link 32. Rather, the test interface module 21 passively monitors the network communication link 32 for information requests directed to the interface module 21. When an information request is received, the test interface module 21 obtains the requested information from the relevant sensor 22, and then transmits the requested information on the network communication link 32 to the intelligent display module 14.

The test interface module 21 may, for example, include as many inputs as there are sensors 22. Each input may include associated switches for configuring the input, an analog-to-digital converter to convert analog signals to a digital format, and any other signal processing circuitry. The number of inputs is not important, since it is possible to use fewer test interface modules each with a larger number of inputs, or more test interface modules each with a smaller number of inputs. The number of inputs is not limited in any particular way and is determined by need.

In practice, the test interface module 21 may be a commercially available unit capable of putting information from discrete sensors onto a network communication link such as SAE (Society of Automotive Engineers) J1708. The test interface module 21 preferably also meets applicable standards for underhood installation, such as SAE J1455, to allow the test interface module to be located in close proximity to the sensors 22 to reduce wiring. The test interface module may, for example, be obtained from Advanced Technology Inc., Elkhart, Ind. 46517 (PN 3246282). Again, however, a wide range of devices of varying construction and complexity could be utilized to implement the test interface module 21.

Figure 2:
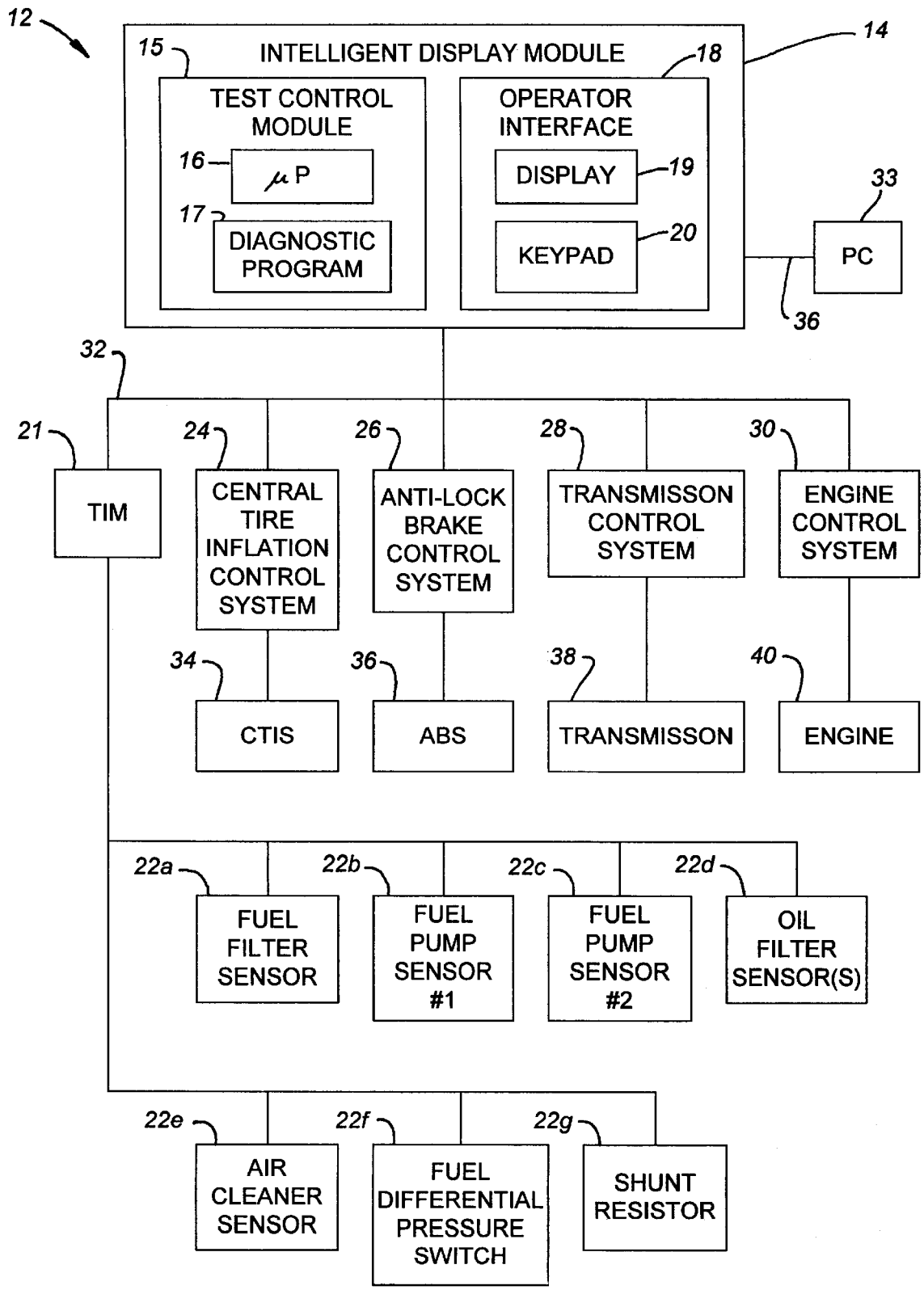
FIG. 2 is a block diagram of the diagnostic system of FIG. 1 showing selected aspects of the diagnostic system in greater detail.

The test interface module 21 is connected to the plurality of sensors 22 which are each capable of obtaining information pertaining to the health and operation of a vehicle subsystem. "Health" and "operation" are interrelated and information that pertains to one will, at least to some extent, pertain to the other as well. The sensors 22 are discrete sensors in the sense that they are not integrally provided with the control systems 24–30 and associated controlled mechanical systems (e.g., engine, transmission, and so on) 34–40. The sensors are add-on devices that are used only in connection with the intelligent display module 14. In general, discrete sensors are preferably only used when the information provided by the sensor is not otherwise available on the network communication link 32. In FIG. 2, the sensors 22 are shown to include a fuel filter inlet pressure sensor 22a, fuel pump outlet pressure sensor 22b, fuel return pressure sensor 22c, oil filter sensors 22d, an air cleaner pressure sensor 22e, a fuel differential pressure switch 22f, and a shunt resistor 22g (used to determine compression imbalance based on unequal current peaks in the starter current).

In addition to the intelligent display module 14 and the test interface module 21, the diagnostic system 12 also includes a plurality of additional vehicle control systems 24–30, as previously noted. As shown in FIG. 2, the control system 24 is a central tire inflation control system that controls a central tire inflation system (CTIS) 34, the control system 26 is an anti-lock brake control system that controls an anti-lock brake system (ABS) 36, the control system 28 is a transmission control system that controls a transmission 38, and the control system 30 is an engine control system that controls an engine 40. The vehicle subsystems formed by the mechanical systems 34–40 and associated control systems 24–30 are conventional and are chosen in accordance with the intended use of the vehicle 10.

The control systems 24–30 each store information pertaining to the health and operation of a respective controlled system. The control systems 24–30 are capable of being queried and, in response, making the requested information available on the network communication link 32. Because the vast amount of information required for performing most diagnostic tests of interest is available from the control systems 24–30 by way of the network communication link 32, it is possible to drastically reduce the number of discrete sensors 22 that are required. Thus, as just noted, discrete sensors are preferably only used when the information provided by the sensor is not otherwise available on the network communication link 32.

Typically, each of the control systems 24–30 comprises a microprocessor-based electronic control unit (ECU) that is connected to the network communication link 32. When the intelligent display module 14 requires status information pertaining to one of the mechanical systems 34–40, the intelligent display module 14 issues a request for the information to the respective one of the control systems 24–30. The respective control system then responds by making the requested information available on the network communication link 32.

Typical ECUs for transmission and engine control systems are capable of producing fault codes and transmitting the fault codes on the network communication link 32. Depending on the type of fault, the fault codes may be transmitted automatically or alternative only in response to a specific request for fault information. Typical ECUs for central tire inflation systems and anti-lock brake systems also transmit fault codes but, in most commercially available systems, fault codes are transmitted only in response to specific requests for fault information. When a fault code is transmitted on the network communication link 32, the intelligent display module 14 receives the fault codes from the network communication link 32, interprets the fault codes, and displays the interpreted fault codes to a human operator using the display 19.

Figure 3:
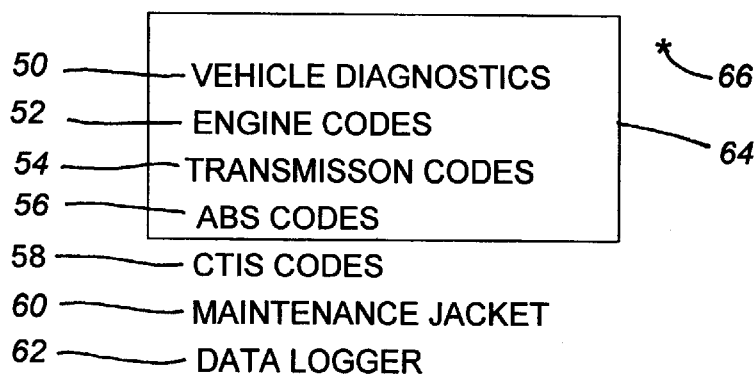
FIG. 3 is a menu displayed by a display of the diagnostic system of FIG. 1 showing various services offered by the diagnostic system.

Referring now to FIG. 3, in general, during operation, the display 19 displays menus to the operator and the keypad receives operator inputs used to navigate the menu, make menu selections, and begin testing. Assuming other services are also provided, the operator is first prompted to select an option from among a list of options that includes options of other services provided by the intelligent display module 14. The list of options may include, for example, an option 50 to perform vehicle diagnostic testing, an option 52 to view engine codes, an option 54 to view transmission codes, an option 56 to view ABS codes, an option 58 to view CTIS codes, an 60 option to view and/or modify data in the vehicle maintenance jacket, and an option 62 to view information stored in a data logger. Given that the display 19 is a four line display in the preferred embodiment, a vertically sliding winding 64 is used to scroll through the options, and the user presses a select button on the keypad 20 when a cursor 66 is positioned on the desired option. As previously noted, other options may also be provided.

Figure 4:
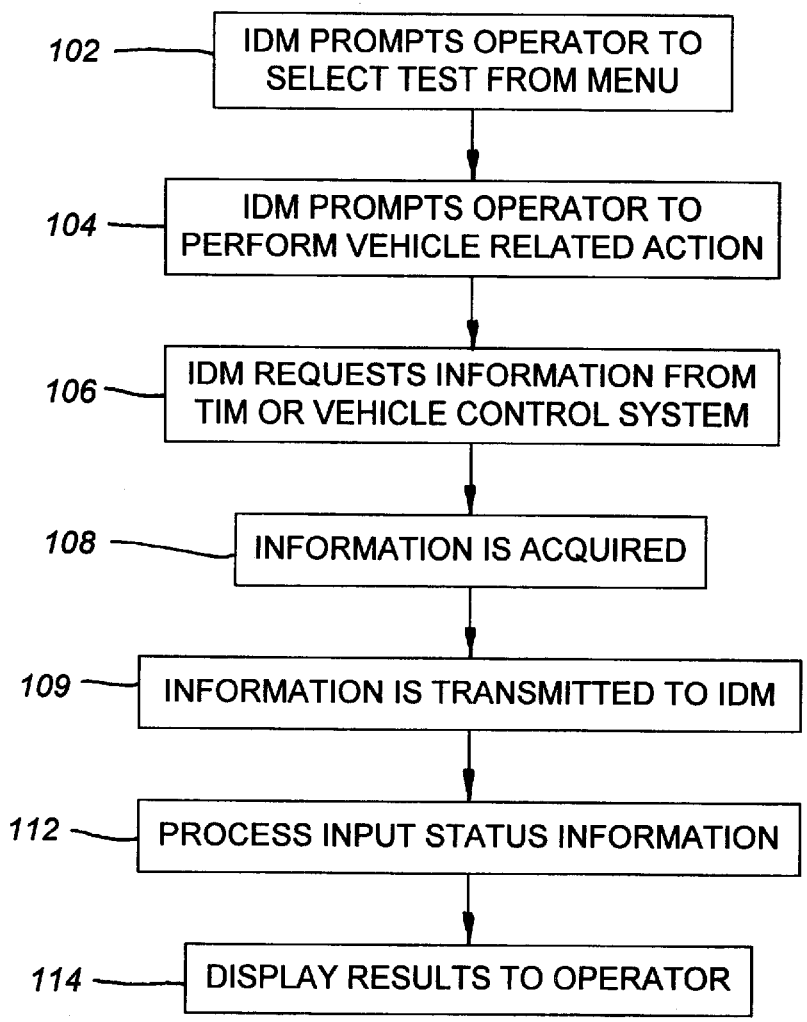
FIG. 4 is a flow chart showing the operation of the diagnostic system of FIG. 1 to perform a diagnostic test procedure.

Referring now to FIG. 4, a flow chart showing the operation of the diagnostic system of FIGS. 1–2 to perform a diagnostic test is illustrated. In connection with military vehicles, the diagnostic system 12 may for example be made capable of performing the following diagnostic tests, all of which provide information pertaining to the health and operation of the tested subsystem:

| Test | Test Description and Application | Exemplary Measurement Range(s) |
| --- | --- | --- |
| ENGINE TESTS | | |
| Engine RPM (AVE) | Measures average speed of engine crankshaft. | 50–5000 RPM |
| Engine RPM, Cranking SI only | Measures cranking RPM. Performed with ignition ON. Inhibit spark plug firing allowing cranking without starting. | 50–1500 RPM |
| Power Test (RPM/SEC) | Measures engine's power producing potential in units of RPM/SEC. Used when programmed engine constants and corresponding Vehicle Identification Number (VID) have not been established. | 500–3500 RPM/s |
| Power Test (% Power) | Measures percentage of engine's power producing potential compared to full power of a new engine. | 0–100% |
| Compression Unbalance (%) | Evaluates relative cylinder compression and displays percent difference between the highest and the lowest compression values in an engine cycle. | 0–90% |
| IGNITION TESTS | | |
| Dwell Angle (TDC) | Measures number of degrees that the points are closed. | 10–72 @ 2000 RPM |
| Points Voltage (VDC) | Measures voltage drop across the points (points positive to battery return). | 0–2 VDC |
| Coil Primary | Measures voltage available at the coil positive terminal of the operating condition of the coil. | 0–32 VDC |
| FUEL/AIR SYSTEM TESTS | | |
| Fuel Supply Pressure (psi) | | 0–100 psi |
| Fuel Supply Pressure (psi) | This test measures the outlet pressure of the fuel pump. | 0–10 psi<br>0–30 psi<br>0–100 psi<br>0–300 psi |
| Fuel Return Pressure (psi) | Measures return pressure to detect return line blockage, leaks, or insufficient restrictor back pressure. | 0–100 psi |
| Fuel Filter Pressure | Detects clogging via opening | PASS/FAIL |

-continued

| Test | Test Description and Application | Exemplary Measurement Range(s) |
|---|---|---|
| Drop (PASS/FAIL) | of a differential pressure switch across the secondary fuel filter. | |
| Fuel Solenoid Voltage (VDC) | Measures the voltage present at the fuel shutoff solenoid positive terminal. | 0–32 VDC |
| Air Cleaner Pressure Drop (RIGHT) (In $H_2O$) | Measures suction vacuum in air intake after the air cleaner relative to ambient air pressure to detect extent of air cleaner clogging. | 0–60 in. $H_2O$ |
| Air Cleaner Pressure Drop (LEFT) (In $H_2O$) | Second air cleaner on dual intake systems. | 0–60 in. $H_2O$ |
| Turbocharger Outlet Pressure (RIGHT) (In Hg) | Measures discharge pressure of the turbocharger. | 0–50 in. Hg |
| Turbocharger Outlet Pressure (LEFT) (In Hg) | Second turbocharger on dual intake systems. | 0–50 in. Hg |
| Airbox Pressure (In Hg) | Measures the airbox pressure of two stroke engines. This measurement is useful in detecting air induction path obstructions or leaks. | 0–20 in. Hg<br>0–50 in. Hg |
| Intake Manifold Vacuum (In Hg) | Spark ignition engine intake system evaluation. | 0–30 in. Hg |
| Intake Manifold Vacuum Variation (in Hg) | Spark ignition engine intake system evaluation. | 0–30 in. Hg |
| LUBRICATION/COOLING SYSTEM TESTS | | |
| Engine Oil Pressure (psi) | Measures engine oil pressure. | 0–100 psi |
| Engine Oil Filter | Measures the pressure drop across the engine oil filter as indicator of filter element clogging. | 0–25 psi |
| Engine Oil Temperature (° F.) | Primarily applicable to air cooled engines. Requires transducer output shorting switch on vehicle to perform system zero offset test. | 120–300° F. |
| Engine Coolant Temperature (° F.) | Transducer output shorting switch on vehicle required. | 120–300° F. |
| STARTING/CHARGING SYSTEM TESTS | | |
| Battery Voltage (VDC) | Measure battery voltage at or near battery terminals. | 0–32 VDC |
| Starter Motor Voltage (VDC) | Measures the voltage present at the starter motor positive terminal. | 0–32 VDC |
| Starter Negative Cable Voltage Drop (VDC) | Measures voltage drop on starter path. A high voltage indicates excessive ground path resistance. | 0–2 VDC |
| Starter Solenoid Volts (VDC) | Measures voltage present at the starter solenoid's positive terminal. Measures current through battery ground path shunt. | 0–32 VDC |
| Starter Current, Average (amps) | Measures starter current. | 0–1000A<br>0–2000A |
| Starter Current First Peak (Peak Amps, DC) | Provides a good overall assessment of complete starting system. Tests condition of the starting circuit and battery's ability to deliver starting current. The measurement is made at the moment the starter is engaed and prior to armature movement. Peak currents | 0–1000A<br>0–2000A |
| Battery Internal Resistance (Milliohms) | less than nominal indicate relatively high resistance caused by poor connections, faulty wiring, or low battery voltage.<br>Evaluate battery condition by measuring battery voltage and current simultaneously. | 0–999.9 mohm |
| Starter Circuit Resistance (Milliohms) | Measures the combined resistance of the starter circuit internal to the batteries. | 0–999.9 mohm |
| Battery Resistance Change (Milliohms/sec) | Measures rate of change of battery resistance as an indicator of battery condition. | 0–999.9 mohm/s |
| Battery Current | Measures current to or from the battery. | –999–1000A<br>–999–2000A |
| Battery Electrolyte Level (PASS/FAIL) | Determines whether electrolyte in the sensed cell is of sufficient level (i.e., in contact with electrolyte probe). | PASS/FAIL |
| Alternator/ Generator Output Voltage (VDC) | Measures output voltage of generator/alternator. | 0–32 VDC |
| Alternator/ Generator Field Voltage (VDC) | Measures voltage present at alternator/generator field windings. | 0–32 VDC |
| Alternator/ Generator Negative Cable Voltage Drop (VDC) | Measures voltage drop in ground cable and connection between alternator/generator ground terminal and battery negative terminal. | 0–2 VDC |
| Alternator Output Current Sense (VAC-RMS) | Measures voltage output at the current transformer in 650 ampere alternator. | 0–3 VAC |
| Alternator AC Voltage Sense (VAC-RMS) | Measures alternator output voltage. | 0–22 VAC |

In general, the specific diagnostic tests that are performed will be selected depending on the application, including the type of equipment utilized by the vehicle 10. Most or all tests may be simple in nature from a data acquisition standpoint, involving primarily bringing the vehicle to a particular operating condition (e.g., engine speed), if necessary, and obtaining information from a suitable transducer constructed and placed to measure the parameter of interest, although more elaborate tests could also be utilized. Any number of different vehicle parameters can be measured, each providing a separate data point regarding the operational health of the vehicle. By providing an operator with enough data points regarding the operational health of the vehicle, the operator can use this information in a known way to determine whether the vehicle is in good working order, or whether some subsystem or component thereof needs to be repaired or replaced.

At step 102, once the vehicle diagnostic option is selected, the display 19 displays a menu of various tests that are available to the operator, and the operator is prompted to select a test from the test menu. Again, the list of options may comprise dozens of options, such as some or all of those listed above, and/or tests other than those listed above, and the operator can scroll through the menu and selected the desired option.

At Step 104, the operator is prompted to perform a vehicle related action. This step, which may or may not be necessary depending on the type of test performed, may be used to prompt the operator to start the engine to develop fuel pressure, oil pressure, and so on, depending on which vehicle parameter is tested. For example, if it is desired to test the operational health of the battery, then the operator may be prompted to engage the starter for a predetermined amount of time to establish a current draw on the battery.

At Step 106, the intelligent display module 14 issues a request for information from the test interface module 21 and/or from one or more of the control systems 24–30. As previously noted, the test interface module 21 does not continually broadcast information on the network communication link 32, because the sensors 22 connected to the test interface module are used only for diagnostic testing and because presumably diagnostic testing will be performed only infrequently. Therefore, when the intelligent display module 14 needs information from one of the sensors 22 pursuant to a test requested to be performed by the operator at the operator interface 18, the intelligent display module 14 requests the test interface module 21 for this information.

Alternatively, the needed information may be of a type that is available from one of the control systems 24–30. The control systems 24–30 are not only able to acquire information from sensors located within the systems 34–40, but are also able to maintain information derived from sensors located within the systems 34–40. For example, the engine control system 30 may maintain information pertaining to the average RPM of the engine, which is a parameter that is not directly measurable but that can be easily calculated based on parameters that are directly measurable. Through the network communication link 32, all of this information is made available to the diagnostic system 12. When the intelligent display module 14 needs information from one of the control systems 24–30 pursuant to a test requested to be performed by the operator at the operator interface 18, the intelligent display module 14 requests the respective control system for this information.

At Step 108, the requested information is retrieved from one of the sensors 22 by the test interface module 21, or from memory or an internal sensor by the respective control system 24–30. At step 109, the information is transmitted from the test interface module 21 or from one of the control systems 24–30 to the intelligent display module 14 by way of the network communication link 32.

At step 112, the input status information is processed at the intelligent display module 14. For example, if fuel supply pressure is measured by one of the sensors 22, then the measured fuel supply pressure may be compared with upper and lower benchmark values to determine whether the fuel pressure is at an acceptable level, or whether it is too high or too low. Finally, at step 114, the results of the test are displayed to the operator.

As has been previously noted, in addition to performing diagnostic tests, the intelligent display module 14 can also be used to provide other services to an operator. For example, the intelligent display module 14 can be used to allow the operator to view engine codes, to view transmission codes, to view ABS codes, and to view CTIS codes. In practice, these services can be implemented simply by allowing acquiring the respective codes from the respective control system 24–30, and displaying the codes to the operator. Additionally, the control systems 24–30 may automatically transmit fault information on the network communication link 32, and the intelligent display module 14 can listen for such fault information and display the fault information to the user when it appears on the network communication link 32.

The intelligent display module 14 also includes sufficient memory to allow maintenance information to be stored therein to implement maintenance jacket functionality. The maintenance log may consist of a table comprising a variety of fields, such as registration numbers, chassis serial number, vehicle codes, and dates and descriptions of maintenance actions performed. This information may be retrieved and manipulated utilizing the computer 33 when the vehicle 10 is taken to a maintenance depot. If the computer 33 is provided with an interactive electronic technical manual (IETM) for the vehicle 10, this allows the IETM to have access to all of the diagnostic data acquired by the intelligent display module 14 as well as all of the maintenance data stored by the intelligent display module 14. This greatly enhances the ability to perform vehicle maintenance and diagnostics on the vehicle 10.

Additionally, sufficient memory capacity is preferably provided so that status information from the test interface module 21 as well as the control systems 24–30 can be sampled and stored at frequent, regular intervals in a circular data queue (i.e., with new data eventually replacing old data in the circular queue). This allows the intelligent display module 14 to provide a data logger service so that input data acquired over a period of time can be viewed to allow an assessment of dynamic conditions leading to a fault to be evaluated. Additionally, the vehicle is preferably provided with one more sensors that indicate whether a severe malfunction (e.g., the vehicle being involved in an accident) has occurred. When inputs from these sensors indicates that a severe malfunction has occurred, data logging is stopped, so that data leading up to the severe malfunction is stored in a manner similar to a so-called "black box recorder."

Figure 5:
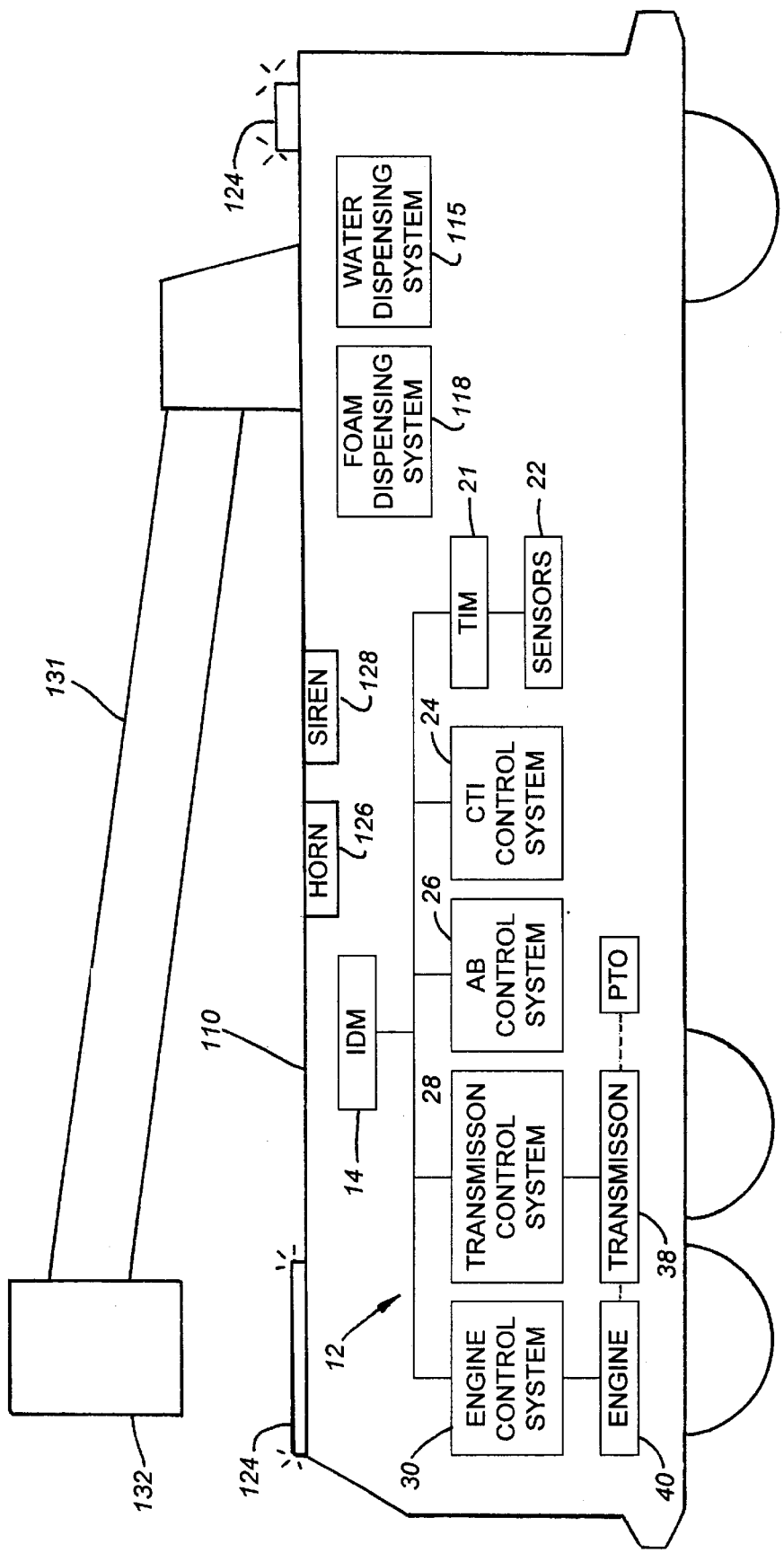
FIG. 5 is a schematic view of a firefighting vehicle having a diagnostic system in accordance with FIGS. 1–4.

Referring now to FIG. 5, a schematic view of another type of equipment service vehicle 110 that utilizes the diagnostic system 12 of FIGS. 1–4 is shown. The equipment service vehicle 110 is a firefighting vehicle and comprises a water dispensing system 115 including water hoses, pumps, control valves, and so on, used to direct water at the scene of a fire. The firefighting vehicle 110 may also comprise a foam dispensing system 118 as an alternative fire extinguishing system. The firefighting vehicle 110 also comprises emergency lighting 124, which may in practice be red and white or red, white and blue flashing lights, as well as an emergency horn 126 and an emergency siren 128 used, among other things, for alerting motorists to the presence of the firefighting vehicle 110 in transit to or at the scene of a fire. The firefighting vehicle 110 may also comprise an extendable aerial 131 that supports a basket 132 used to vertically carry firefighting personnel to an emergency situation at the scene of a fire. The diagnostic system 12 may be used to diagnose vehicle malfunctions in the manner described above in connection with the vehicle 10, as well as to diagnose malfunctions of the specialized systems described above found on firefighting vehicles.

Figure 6:
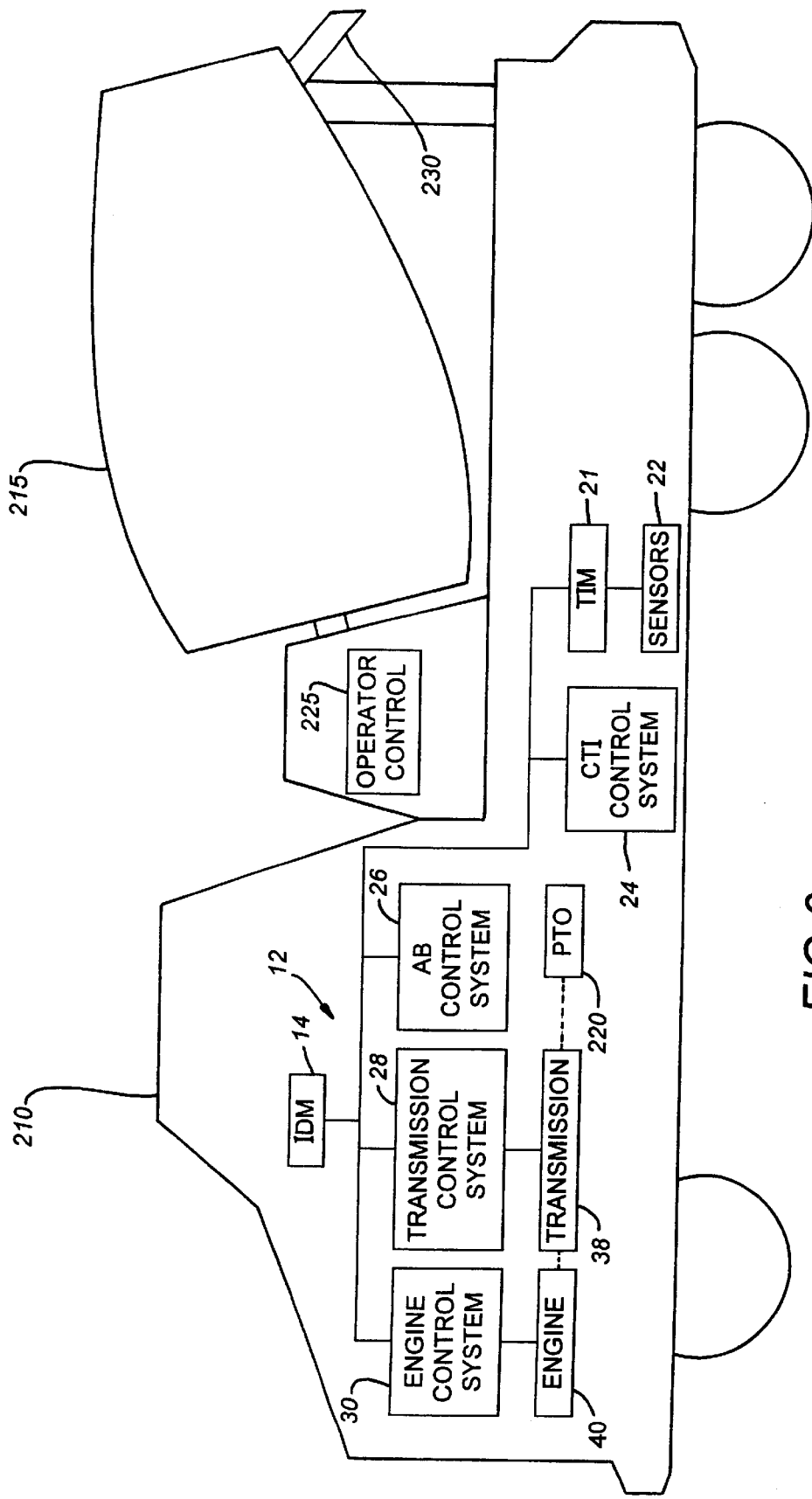
FIG. 6 is a schematic view of a mixing vehicle having a diagnostic system in accordance with FIGS. 1–4.

Referring now to FIG. 6, a schematic view of another type of equipment service vehicle 210 that utilizes the diagnostic system 12 of FIGS. 1–4 is shown. The equipment service vehicle 210 is a mixing vehicle such as a cement mixing vehicle. The mixing vehicle 210 comprises a rotatable mixing drum 215 that is driven by engine power from the engine 40 via a power takeoff mechanism 220. Rotation of the mixing drum 215 is controlled under operator control using a control system 225. The mixing vehicle 210 also includes a dispenser 230 that dispenses the mixed matter or material, for example, mixed cement. The diagnostic system 12 may be used to diagnose vehicle malfunctions in the manner described above in connection with the vehicle 10, as well as to diagnose malfunctions of the specialized systems described above found on mixing vehicles.

Figure 7:
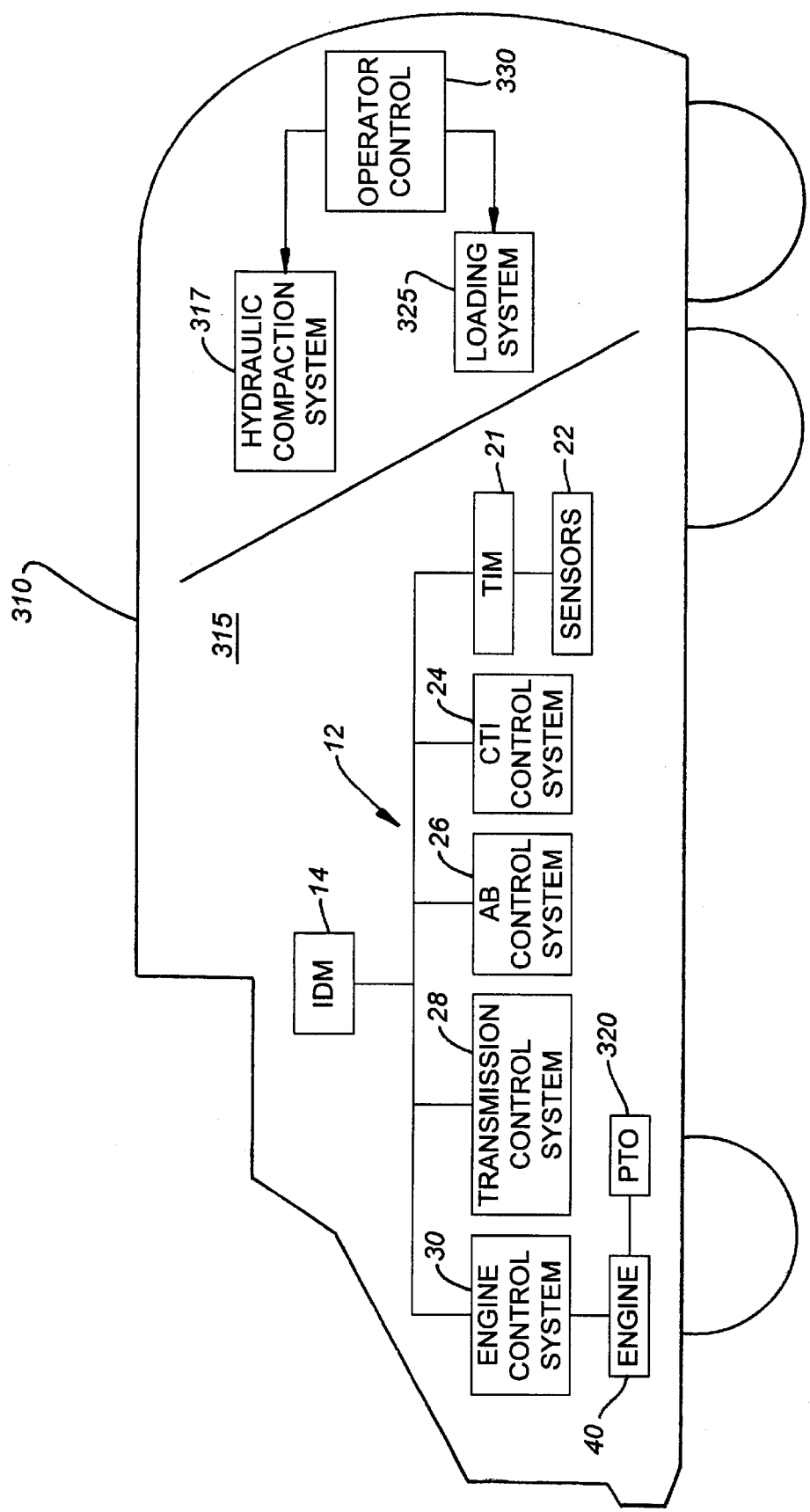
FIG. 7 is a schematic view of a refuse handling vehicle having a diagnostic system in accordance with FIGS. 1–4.

Referring now to FIG. 7, a schematic view of another type of equipment service vehicle 310 that utilizes the diagnostic system 12 of FIGS. 1–4 is shown. The equipment service vehicle 310 is a refuse handling vehicle and comprises one or more refuse compartments 315 for storing collected refuse and other materials such as goods for recycling. The refuse handling vehicle 310 also includes a hydraulic compactor 317 for compacting collected refuse. The hydraulic compactor 317 is driven by engine power from the engine 40 via a power takeoff mechanism 320. The refuse handling vehicle may also include an automatic loading or tipping system 325 for loading large refuse containers and for transferring the contents of the refuse containers into one of the compartments 315. The loading system 325 as well as the hydraulic compactor may controlled under operator control using a control system 330. The diagnostic system 12 may be used to diagnose vehicle malfunctions in the manner described above in connection with the vehicle 10, as well as to diagnose malfunctions of the specialized systems described above found on refuse handling vehicles.

Figure 8:
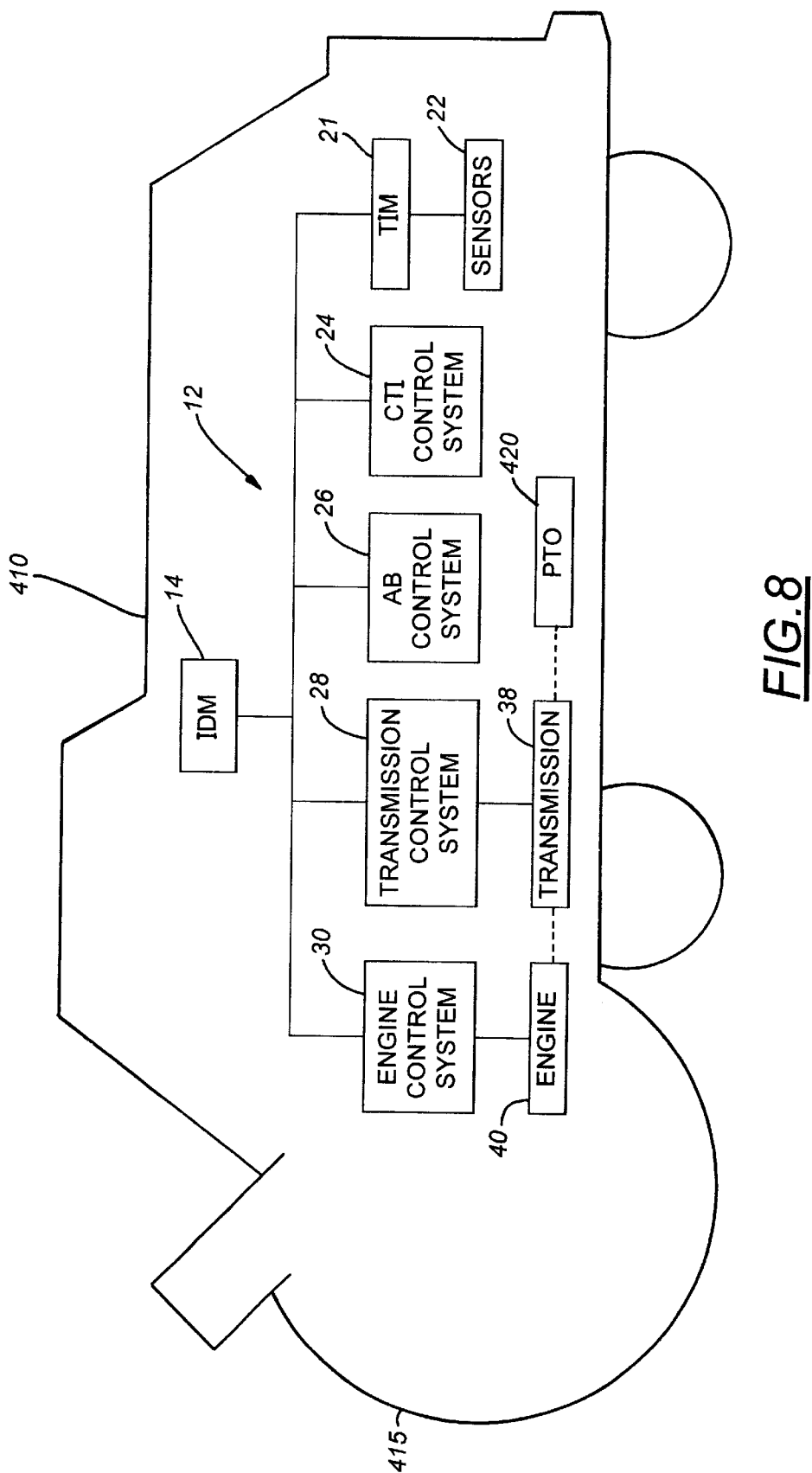
FIG. 8 is a schematic view of a snow removal vehicle having a diagnostic system in accordance with FIGS. 1–4.

Referring now to FIG. 8, a schematic view of another type of equipment service vehicle 410 that utilizes the diagnostic system 12 of FIGS. 1–4 is shown. The equipment service vehicle 410 is a snow removal vehicle and comprises a snow removal device 415 which may, for example, be a rotary blower, plow, or sweeper. The snow removal device 415 may be driven by engine power from the engine 40 via a power takeoff mechanism 420 to remove snow from a region near the snow removal vehicle 410 as the snow removal vehicle 410 is moving. The diagnostic system 12 may be used to diagnose vehicle malfunctions in the manner described above in connection with the vehicle 10, as well as to diagnose malfunctions of the specialized systems described above found on snow removal vehicles.

Advantageously, due to the utilization of a network architecture in the preferred embodiment, the diagnostic system is able to use sensors and other sources of information that are already provided on the vehicle, because it is able to interact with other vehicle control systems such as the engine control system, the anti-lock brake control system, the central tire inflation control system, and so on, via a network communication link. The fact that the diagnostic system is connected to these other systems, which are all typically capable of providing a vast array of status information, puts this status information at the disposal of the diagnostic system.

Further, due to the utilization of an intelligent display module in the preferred embodiment, it is possible for the intelligent display module to be connected to the network communication link and collect information as necessary for a variety of purposes. Thus, the preferred intelligent display module is microprocessor-based and is capable of executing firmware to provide additional functionality such as data logging, accident reconstruction, and a vehicle maintenance record. Again, this functionality can be achieved by taking advantage of the information available from the vehicle subsystems by way of the network architecture.

Moreover, by mounting the intelligent display module on board the vehicle in the preferred embodiment, for example, in an operator compartment, it is not necessary to bring the vehicle to a maintenance depot to have vehicle malfunctions diagnosed. The services offered by the intelligent display module are available wherever and whenever the vehicle is in operation.

Many other changes and modifications may be made to the present invention without department from the spirit thereof. The scope of these and other changes will become apparent from the appended claims.

What is claimed is:

1. A diagnostic testing method for a military vehicle, the method comprising:
   (A) providing the military vehicle with an on-board diagnostic system comprising a test control module, an operator interface, a test interface module, a sensor, a plurality of vehicle subsystems and a network communication link, the sensor being connected to the test interface module, the test interface module being connected to the test control module and at least some of the plurality of vehicle subsystems by way of the network communication link;
   (B) measuring a plurality of parameters that pertain to health and operation of the plurality of vehicle subsystems, including
      (1) measuring a speed of a crankshaft of an engine,
      (2) measuring cranking RPM of the engine,
      (3) measuring relative cylinder compression unbalance of the engine,
      (4) measuring a fuel pump supply pressure,
      (5) measuring a fuel pump return pressure,
      (6) measuring a voltage across a fuel solenoid,
      (7) measuring an air cleaner pressure drop,
      (8) measuring an outlet pressure of a turbocharger,
      (9) measuring an airbox pressure,
      (10) measuring an engine intake manifold vacuum,
      (11) measuring an engine intake manifold vacuum variation,
      (12) measuring an engine oil pressure,
      (13) measuring a pressure drop across an engine oil filter,
      (14) measuring an engine coolant temperature,
      (15) measuring a voltage at or near battery terminals,
      (16) measuring a voltage at or near engine starter terminals,
      (17) measuring a voltage drop introduced by a starter cable,
      (18) measuring a voltage present at or near a starter solenoid,
      (19) measuring a current through an engine starter motor,
      (20) measuring a peak initial starter current,
      (21) measuring a battery internal resistance,
      (22) measuring a starter circuit resistance,
      (23) measuring battery current,
      (24) measuring an output voltage of an alternator, and
      (25) measuring a voltage drop introduced by an alternator cable;
   (C) displaying a menu of test options to an operator using the operator interface;
   (D) receiving an operator input using the operator interface, the input being indicative of a menu selection made by the operator, the menu selection designating one of the measuring steps B(1)–B(25);
   (E) displaying measurement results to the operator using the operator interface, the measurement results pertaining to a parameter measured during the designated one of the measuring steps B(1)–B(25), the parameter being one of the plurality of parameters; and
   wherein the military vehicle is capable of travelling on unimproved terrain and through at least three feet of water; and
   wherein one of the measuring steps B(1)–B(25) is performed using the sensor, wherein the test interface module receives a request for information from the test control module, wherein the test interface module acquires the health and operation information from the sensor and transmits the health and operation information to the test control module by way of the network communication link.

2. A method according to claim 1, wherein the parameter measured during the designated one of the measuring steps B(1)–B(25) is measured in response to receiving the corresponding menu selection made by the operator.

3. A method according to claim 1, further comprising transmitting information pertaining to health and operation of one of the plurality of vehicle subsystems from an electronic control system for the subsystem to the test control module by way of the network communication link.

4. A method according to claim 3, wherein the vehicle subsystem is an engine system comprising the electronic control system and the engine, wherein the electronic control system is an electronic engine control system that controls the engine, and wherein the method further comprises transmitting information pertaining to the health and operation of the engine system from the electronic engine control system to the test control module by way of the network communication link.

5. A method according to claim 4, further comprising
producing fault codes and transmitting the fault codes on the network communication link, the producing and transmitting steps being performed by the electronic engine control system, and
receiving the fault codes from the network communications link, interpreting the fault codes, and displaying the interpreted fault codes to the operator, the receiving, interpreting and displaying steps being performed by the test control module and the operator interface.

6. A method according to claim 1, further comprising transmitting information pertaining to at least some of the plurality of parameters measured during the measuring steps B(1)–B(25) to a computer-implemented interactive electronic technical manual.

7. A method according to claim 1, wherein the operator input is received before the parameter is measured.

8. A method according to claim 1, further comprising prompting the operator to step through a test procedure, the prompting step being performed using the operator interface.

9. A method according to claim 1, further comprising prompting the operator to take a vehicle-related action to alter an operating a point of the military vehicle, the prompting step being performed using the operator interface.

10. An equipment service vehicle system comprising:
(A) a network communication link;
(B) a plurality of vehicle subsystems;
(C) a sensor, the sensor being configured to obtain health and operation information for a vehicle device;
(D) an on-board diagnostic system including an on-board test control module and an on-board operator interface, the on-board operator interface displaying a plurality of test options to an operator and receiving a selection of a test from the operator, the test control module being connected to at least some of the plurality of vehicle subsystems by way of the network communication link, the on-board test control module transmitting a request for information pertaining to the health and operation of the vehicle device on the network communication link; and
(E) a test interface module, the test interface module being connected to the sensor, the test interface module being connected to the on-board test control module by way of the network communication link, the test interface module receiving the request for information pertaining to the health and operation of the vehicle device, the test interface module acquiring the requested information from the sensor and transmitting the requested information to the test control module; and
wherein the test control module receives health and operation information from one of the respective vehicle subsystem or the test interface module or both and wherein the operator interface displays results of the test to the operator.

11. A vehicle system according to claim 10, wherein the plurality of vehicle subsystems include an engine system including an engine control system and a transmission system including a transmission control system, wherein the engine control system and the transmission control system are each capable of producing fault codes and transmitting the fault codes on the network communication link, and wherein the test control module and the operator interface in combination are capable of receiving the fault codes from the network communication link and displaying the fault codes to a human operator.

12. A vehicle system according to claim 11, wherein the fault codes are displayed in an interpreted format.

13. A vehicle system according to claim 10, wherein the on-board diagnostic system stores a vehicle maintenance record, the vehicle maintenance record comprising a descriptive log of maintenance activities performed on the vehicle.

14. A vehicle system according to claim 10, further comprising a memory that stores a running log of health and operation information pertaining to the vehicle.

15. A vehicle system according to claim 10, wherein the operator interface and the test control module are provided as a single integrated unit.

16. A vehicle system according to claim 10, wherein the sensor is a first sensor and wherein the test control module is connected to at least one additional sensor.

17. A vehicle system according to claim 10, wherein the test interface module is a separate unit from the sensor.

18. A vehicle system according to claim 10, wherein the operator interface includes a display that is mounted in a location that is viewable from within an operator compartment of the vehicle.

19. A vehicle system according to claim 10, wherein the operator interface is mounted within an operator compartment of the vehicle.

20. A vehicle system according to claim 10, wherein the operator interface is at least semi-permanently mounted within the vehicle.

21. A vehicle system according to claim 10, wherein the test is performed in response to the selection by the operator.

22. A vehicle system according to claim 10, wherein the test control module receives health and operation information including fault codes transmitted by each of an engine control system, a transmission control system, an antilock brake control system, and a central tire inflation control system.

23. A vehicle system according to claim 10, wherein the vehicle system further comprises a computer which implements an interactive electronic technical manual, wherein the on-board diagnostic system transmits health and operation to the interactive electronic technical manual, and wherein the interactive electronic technical manual processes the health and operation information from the on-board diagnostic system.

24. A vehicle system according to claim 23, wherein the computer is off-board the vehicle.

25. A vehicle system according to claim 10, wherein the equipment service vehicle is a military vehicle capable of travelling on unimproved terrain and through at least three feet of water.

26. A vehicle system according to claim 10, wherein the equipment service vehicle is a fire fighting vehicle.

27. A vehicle system according to claim 10, wherein the equipment service vehicle is a snow removal vehicle.

28. A vehicle system according to claim 10, wherein the equipment service vehicle is a mixer vehicle.

29. A vehicle system according to claim 10, wherein the equipment service vehicle is a refuse handling vehicle.

30. A diagnostic testing method to be executed by an on-board diagnostic system of an equipment service vehicle having a plurality of subsystems, the method comprising:

displaying a plurality of test options to an operator using an on-board operator interface, the operator interface being connected to a test control module;

receiving an operator input using the operator interface, the input being indicative of a selection made by the operator, the selection indicating a test selected by the operator;

performing the selected test on the vehicle using a sensor or at least one of the plurality of vehicle subsystems or both, the plurality of subsystems being connected to the test control module by way of a network communication link, the sensor being configured to obtain health and operation information for a vehicle device, the sensor being connected to a test interface module that is connected to the network communication link;

acquiring health and operation information pertaining to results of the test from the at least one vehicle subsystem or from the test interface module using the sensor or from both;

transmitting the health and operation information from the test interface module or the at least one vehicle subsystem or both to the test control module by way of the network communication link; and displaying the results of the test to the operator using the operator interface.

31. A method according to claim 30, further comprising transmitting at least some of the health and operation information from the on-board diagnostic system to a computer-implemented interactive electronic technical manual.

32. A method according to claim 31, wherein the computer-implemented interactive electronic technical manual is separate from the on-board diagnostic system and is implemented in a computer that is off-board the vehicle.

33. A method according to claim 30, wherein the selected test is performed after the operator input is received.

34. A method according to claim 30, further comprising prompting the operator to step through a test procedure, the prompting step being performed using the operator interface.

35. A method according to claim 30, further comprising prompting the operator to take a vehicle-related action to alter an operating point of the vehicle, the prompting step being performed using the operator interface.

36. A method according to claim 30, further comprising semi-permanently mounting the operator interface in an operator compartment of the vehicle.

37. A method according to claim 30, wherein the vehicle subsystem is an engine system comprising an electronic control system and an engine, wherein the electronic control system is an electronic engine control system that controls the engine, and wherein the method further comprises communicating information pertaining to the health and operation of the engine system from the electronic engine control system to the operator interface by way of the network communication link.

38. A method according to claim 37, wherein the information is further transmitted by way of the test control module, the test control module being coupled between the network communication link and the operator interface.

39. A method according to claim 37, further comprising producing fault codes and transmitting the fault codes on the network communication link, the producing and transmitting steps being performed by the electronic engine control system, and receiving the fault codes from the network communication link, interpreting the fault codes, and displaying the interpreted fault codes to the operator, the receiving, interpreting and displaying steps being performed by the a test control module and the operator interface.

40. A method according to claim 37, further comprising storing the health and operation information of the vehicle subsystem in a data queue in the test control module, the data queue comprising a memory in which the information is stored such that newer information eventually replaces older information in the data queue.

41. A method according to claim 40, further comprising detecting a severe vehicle malfunction and terminating the storing step upon detecting the severe vehicle malfunction.

42. A method according to claim 30, wherein the operator interface and the test control module are provided as a single integrated unit.

43. Method according to claim 30, wherein the sensor is a first sensor and wherein the test interface module is connected to at least one additional sensor.

44. A method according to claim 30, wherein the test interface module is a separate unit from the sensor.

45. A method according to claim 30, further comprising storing information in a computer-implemented vehicle maintenance record on-board the vehicle, the information comprising a descriptive log of maintenance activities performed with respect to the vehicle.

46. A method according to claim 30, further comprising acquiring information pertaining to health and operation of vehicle subsystems or devices, including:

(1) acquiring information pertaining to a speed of a crankshaft of an engine, (2) acquiring information pertaining to a cranking RPM of the engine, (3) acquiring information pertaining to a fuel pump supply pressure, (4) acquiring information pertaining to a fuel pump return pressure, (5) acquiring Information pertaining to an air cleaner pressure drop, (6) acquiring information pertaining to an outlet pressure of a turbocharger, (7) acquiring information pertaining to an airbox pressure, (8) acquiring information pertaining to an engine intake manifold vacuum, (9) acquiring information pertaining to an engine intake manifold vacuum variation,

(10) acquiring information pertaining to an engine oil pressure,

(11) acquiring information pertaining to a pressure drop across an engine oil filter,
(12) acquiring information pertaining to an engine coolant temperature,
(13) acquiring information pertaining to a voltage at or near battery terminals,
(14) acquiring information pertaining to a voltage at or near engine starter terminals,
(15) acquiring information pertaining to a voltage drop introduced by a starter cable,
(16) acquiring information pertaining to a voltage present at or near a starter solenoid,
(17) acquiring information pertaining to a current through an engine starter motor,
(18) acquiring information pertaining to a peak initial starter current,
(19) acquiring information pertaining to a battery internal resistance,
(20) acquiring information pertaining to a starter circuit resistance,
(21) acquiring information pertaining to battery current,
(22) acquiring information pertaining to an output voltage of an alternator, and
(23) acquiring information pertaining to a voltage drop introduced by an alternator cable.

47. A method according to claim 30, wherein the test control module and the test interface module are provided as separate units.

48. An equipment service vehicle comprising:
(A) a network communication link;
(B) a plurality of vehicle subsystems including
  (1) a first vehicle subsystem, the first vehicle subsystem including an engine and an electronic engine control system that is coupled to the engine and to the network communication link, the electronic engine control system controlling the engine and transmitting data pertaining to the health and operation of the engine on the network communication link;
  (2) a second vehicle subsystem, the second vehicle subsystem including a transmission and an electronic transmission control system, the electronic transmission control system controlling the transmission and transmitting data pertaining to the health and operation of the transmission on the network communication link;
(C) a plurality of additional vehicle subsystems;
(D) a sensor, the sensor being configured to obtain health and operation information for a vehicle device;
(E) an on-board test control module and an on-board operator interface,
  (1) wherein the on-board test control module and the operator interface in combination are (a) coupled to at least some of the plurality of vehicle subsystems by way of the network communication link, and (b) capable of performing diagnostic tests by acquiring, storing and displaying at least some of the information from the network communication link pertaining to the health and operation of the engine and the transmission,
  (2) wherein the operator interface displays a plurality of test options to an operator,
  (3) wherein the operator interface receives an operator input indicative of a selection made by the operator, the selection Indicating a test selected by the operator, and
  (4) wherein the on-board test control module transmits a request for information on the network communication link;
(F) a test interface module, the test interface module being connected to the sensor, the test interface module being connected to the on-board test control module by way of the network communication link, the test interface module receiving the request for information and transmitting the requested information to the test control module; and
wherein the test control module receives health and operation information from one of a respective vehicle subsystem or the test interface module or both and wherein the operator interface displays results of the test to the operator.

* * * * *

UNITED STATES PATENT AND TRADEMARK OFFICE
CERTIFICATE OF CORRECTION

PATENT NO. : 6,553,290 B1
DATED : April 22, 2003
INVENTOR(S) : Duane R. Pillar

It is certified that error appears in the above-identified patent and that said Letters Patent is hereby corrected as shown below:

Column 15,
Line 47, delete the word "a" between the words "operating" and "point".

Column 20,
Line 25, replace "Indicating" with -- indicating --.

Signed and Sealed this

Eighth Day of July, 2003

JAMES E. ROGAN
*Director of the United States Patent and Trademark Office*